United States Patent
Blumenschein et al.

(10) Patent No.: US 11,145,995 B2
(45) Date of Patent: Oct. 12, 2021

(54) ELECTRICAL CONTACT ELEMENT AND METHOD OF PRODUCING A HARD-SOLDERED, ELECTRICALLY CONDUCTIVE CONNECTION TO A MATING CONTACT BY MEANS OF A PRESSED-IN SOLDERING BODY MADE FROM HARD SOLDER

(71) Applicant: TE Connectivity Germany GmbH, Bensheim (DE)

(72) Inventors: Rudi Blumenschein, Ellwangen (DE); Frank Kaehny, Lautertal (DE); Kai Kioschis, Moerlheim (DE); Andre Martin Dressel, Lampertheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 364 days.

(21) Appl. No.: 15/939,723

(22) Filed: Mar. 29, 2018

(65) Prior Publication Data
US 2018/0287270 A1    Oct. 4, 2018

(30) Foreign Application Priority Data
Mar. 29, 2017    (DE) .......................... 102017205360.7

(51) Int. Cl.
*B23K 1/00*    (2006.01)
*H01R 4/02*    (2006.01)
(Continued)

(52) U.S. Cl.
CPC ............ *H01R 4/027* (2013.01); *H01M 2/206* (2013.01); *H01R 4/022* (2013.01); *H01R 4/028* (2013.01);
(Continued)

(58) Field of Classification Search
CPC .... H01R 4/027; H01R 4/022; H01R 43/0263; H01R 43/0235; H01R 4/028; H01R 4/34;
(Continued)

(56) References Cited

U.S. PATENT DOCUMENTS 3,778,755 A * 12/1973 Marks ................... H01R 12/58
439/853
3,865,455 A * 2/1975 Berg .................... H05K 3/3447
439/82

(Continued)

FOREIGN PATENT DOCUMENTS

CN    101268308 A    9/2008
CN    101682126 A    3/2010
(Continued)

OTHER PUBLICATIONS

Office Action from Chinese Patent Office and English translation thereof, dated Sep. 2, 2020, 16 pp.
(Continued)

*Primary Examiner* — Kiley S Stoner
(74) *Attorney, Agent, or Firm* — Barley Snyder

(57) ABSTRACT

An electrical contact for forming a materially bonded, electrically conductive connection to a mating contact comprises a contact surface and a soldering body. The contact surface has a recess extending into the contact surface. The soldering body is formed of a hard solder material and is pressed into the recess. The soldering body protrudes out from the recess beyond the contact surface.

19 Claims, 1 Drawing Sheet

(51) Int. Cl.
*H01M 2/20* (2006.01)
*H01R 43/02* (2006.01)
*H01R 11/28* (2006.01)
*H01R 4/38* (2006.01)
*H01R 4/34* (2006.01)
*B23K 101/38* (2006.01)
*H01R 4/44* (2006.01)
*H01R 11/12* (2006.01)
*H01R 11/16* (2006.01)

(52) U.S. Cl.
CPC ..... *H01R 43/0235* (2013.01); *H01R 43/0263* (2013.01); *B23K 2101/38* (2018.08); *H01M 2220/20* (2013.01); *H01R 4/34* (2013.01); *H01R 4/38* (2013.01); *H01R 4/44* (2013.01); *H01R 11/12* (2013.01); *H01R 11/16* (2013.01); *H01R 11/281* (2013.01)

(58) Field of Classification Search
CPC ........ H01R 4/38; H01R 11/281; H01R 11/16; H01R 11/12; H01R 4/44; H01R 2201/26; H01M 2/206; H01M 2220/20; H01M 2/22; B23K 1/0016; B23K 2101/36–42
USPC .................................. 228/179.1–180.22, 165
See application file for complete search history.

(56) References Cited

U.S. PATENT DOCUMENTS

| | | | | |
|---|---|---|---|---|
| 4,181,385 A * | 1/1980 | DeSantis | ................ | H01R 12/58 439/83 |
| 4,211,603 A * | 7/1980 | Reed | ................ | H05K 3/429 174/266 |
| 4,509,096 A * | 4/1985 | Baldwin | ........... | H01L 23/49855 174/16.3 |
| 4,802,862 A * | 2/1989 | Seidler | ................ | H01R 12/585 439/83 |
| 4,881,906 A * | 11/1989 | Mackanic | ............ | H01R 12/526 439/83 |
| 5,052,954 A * | 10/1991 | Seidler | .................. | H01R 12/57 29/843 |
| 5,074,035 A * | 12/1991 | Tyznik | ................... | F42B 3/124 102/202.7 |
| 5,928,005 A * | 7/1999 | Li | ........................ | H01R 4/50 439/632 |
| 6,192,579 B1 * | 2/2001 | Hayashi | ........... | H01L 23/49816 29/846 |
| 6,297,961 B1 * | 10/2001 | Koizumi | .............. | H05K 1/0204 165/185 |
| 6,383,603 B1 * | 5/2002 | Nojioka | ................ | H05K 1/116 174/261 |
| 6,429,383 B1 * | 8/2002 | Sprietsma | .............. | H05K 1/113 174/260 |
| 6,574,113 B2 * | 6/2003 | Armezzani | ....... | H01L 23/49816 174/260 |
| 7,758,350 B2 * | 7/2010 | Zanolli | ................ | B23K 1/0016 439/65 |
| 2002/0146921 A1 * | 10/2002 | Lu | ......................... | H01R 12/58 439/83 |
| 2002/0158110 A1 * | 10/2002 | Caletka | ................ | B23K 3/0623 228/180.22 |
| 2004/0027807 A1 * | 2/2004 | Kashiwagi | .......... | H01L 23/4093 361/704 |
| 2004/0097004 A1 * | 5/2004 | Pogge | ............... | H01L 21/76898 438/52 |
| 2005/0109524 A1 * | 5/2005 | Cachina | ............... | H05K 3/3426 174/535 |
| 2005/0156012 A1 * | 7/2005 | Ju | ........................ | B23K 1/0016 228/180.1 |
| 2005/0258544 A1 * | 11/2005 | Kim | .................. | H01L 23/49816 257/773 |
| 2006/0160261 A1 * | 7/2006 | Sheats | ................. | H01L 31/0392 438/34 |
| 2007/0202719 A1 * | 8/2007 | Saka | ....................... | H05K 3/308 439/83 |
| 2008/0139011 A1 * | 6/2008 | Uka | ....................... | H01R 4/024 439/65 |
| 2010/0000982 A1 * | 1/2010 | Allgaier | ................ | F23Q 7/001 219/270 |
| 2010/0248504 A1 * | 9/2010 | Yeh | .................... | H01R 43/0256 439/74 |
| 2011/0149536 A1 * | 6/2011 | Tsuruzawa | ........... | H05K 5/0069 361/760 |
| 2014/0291701 A1 * | 10/2014 | Hayashida | ............... | H01L 25/16 257/77 |
| 2015/0098178 A1 * | 4/2015 | Otake | ................. | G11B 33/1446 361/679.33 |
| 2016/0037638 A1 * | 2/2016 | Inamori | .................. | H05K 1/147 174/254 |
| 2016/0242306 A1 * | 8/2016 | Ueyama | .................. | H05K 1/18 |
| 2016/0295706 A1 * | 10/2016 | Jiang | ....................... | F21K 9/272 |
| 2019/0181074 A1 * | 6/2019 | Huang | .................... | H01L 23/48 |

FOREIGN PATENT DOCUMENTS

| | | | | |
|---|---|---|---|---|
| CN | 101719604 A | | 6/2010 | |
| CN | 201732870 U | | 2/2011 | |
| CN | 201812934 U | * | 4/2011 | |
| CN | 205231264 U | | 5/2016 | |
| GB | 778287 A | * | 7/1957 | ............. H01R 4/363 |
| GB | 783545 A | | 9/1957 | |
| GB | 1497644 A | * | 1/1978 | ........... H05K 3/4046 |
| JP | 03085799 A | * | 4/1991 | |
| JP | 03190063 A | * | 8/1991 | |
| JP | 07226240 A | * | 8/1995 | |
| JP | 07288375 A | * | 10/1995 | |
| JP | 11068306 A | * | 3/1999 | |
| WO | WO-2005122655 A2 | * | 12/2005 | ............. H05K 1/116 |
| WO | 2014181741 A1 | | 11/2014 | |

OTHER PUBLICATIONS

Abstract of CN101268308 (A), dated Sep. 17, 2008, 1 page.
Abstract of CN101682126 (A), dated Mar. 24, 2010, 1 page.
Abstract of CN101719604 (A), dated Jun. 2, 2010, 1 page.
Abstract of CN201732870 (U), dated Feb. 2, 2011, 1 page.
Abstract of CN205231264 (U), dated May 11, 2016, 1 page.
Abstract of WO2014181741 (A1), dated Nov. 13, 2014, 2 pages.

* cited by examiner

ELECTRICAL CONTACT ELEMENT AND METHOD OF PRODUCING A HARD-SOLDERED, ELECTRICALLY CONDUCTIVE CONNECTION TO A MATING CONTACT BY MEANS OF A PRESSED-IN SOLDERING BODY MADE FROM HARD SOLDER

CROSS-REFERENCE TO RELATED APPLICATION

This application claims the benefit of the filing date under 35 U.S.C. § 119(a)-(d) of German Patent Application No. 102017205360.7, filed on Mar. 29, 2017.

FIELD OF THE INVENTION

The present invention relates to an electrical contact and, more particularly, to an electrical contact soldered to a mating contact.

BACKGROUND

Batteries of electric vehicles commonly have a plurality of cells that generate a high current and are connected in series. The cells are often also referred to as modules. The wires which contact the single cells are connected by cell connectors. Due to the high currents, the conductors of the wires have large cross-sections such that large forces are necessary for their connection. The conductors of the wires are commonly pushed against each other by a screw and a contact mounted between the two conductors. In some designs, the screw penetrates the conductor and the contact.

A higher contact pressure is necessary not only to move the electrical conductors, which are typically heavy and rigid for high direct currents, but also to level out unevenness of the surface and to achieve an overlay which is as extensive as possible through an elastic deformation of the contact surfaces of the conductor and of the contact. The larger the surface via which the electrical contact and the electrical conductors, which serve as mating contacts, abut each other, the lower the transition resistance. With a low transition resistance, electrical losses can be reduced, and the cell connector does not heat up excessively. There is a need in the art to reduce or limit the transition resistance as much as possible.

SUMMARY

An electrical contact for forming a materially bonded, electrically conductive connection to a mating contact comprises a contact surface and a soldering body. The contact surface has a recess extending into the contact surface. The soldering body is formed of a hard solder material and is pressed into the recess. The soldering body protrudes out from the recess beyond the contact surface.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
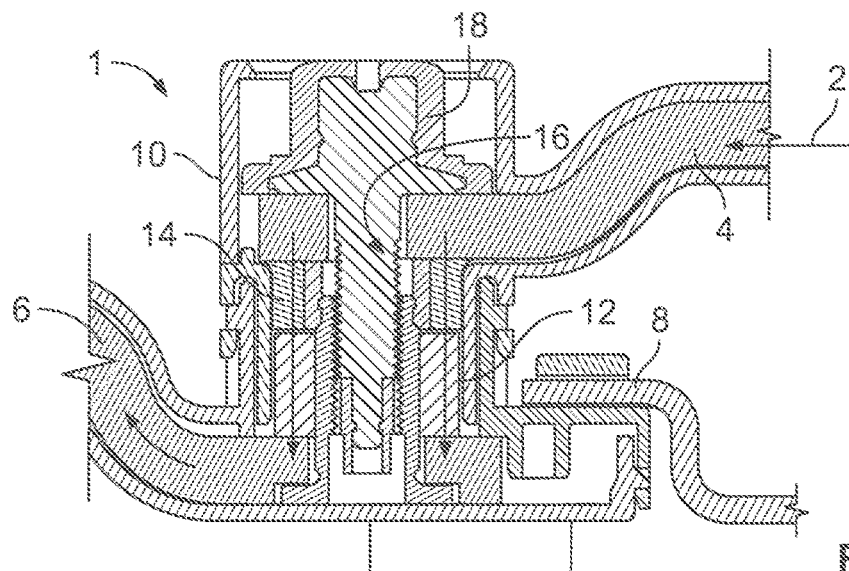
FIG. 1 is a sectional view of a cell connector according to an embodiment.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

A cell connector 1 according to an embodiment is shown in FIG. 1. In an embodiment, the cell connector 1 is used to electrically connect individual cells or modules of a multi-cellular vehicle battery in series. A flow of current in the cell connector 1 is schematically depicted by arrows 2. A first electrical conductor 4 is electrically connected by the cell connector 1 to a second electrical conductor 6, referred to here as the mating contact. The cell connector 1 further has an grounding connection 8 which, electrically separated from the conductors 4, 6, is electrically connected to a housing 10 of the cell connector 1. In the shown embodiment, the cell connector 1 has a contact 12 and am additional contact 14. In an embodiment, the contact 12 and the additional contact 14 have an annular shape. In another embodiment, the additional contact 14 can be omitted.

The contact 12, as shown in FIG. 1, is disposed between the conductors 4, 6 and rests on the mating contact 6. The conductor 4, the additional contact 14, the contact 12, and the mating contact 6 are pushed together via a screw 16 to obtain a full-surface overlay with a low transition resistance and a mechanically tough connection. The screw 16 extends through the elements 4, 12, 14 and 6. An insulating body 18 disposed on the screw 16 provides an outward electrical insulation for the screw 16 and acts as a contact preventer.

In order to reduce the transition resistance, the contact 12 is hard-soldered to the mating contact 6 as described in greater detail below with reference to FIGS. 2 and 3.

Figure 3:
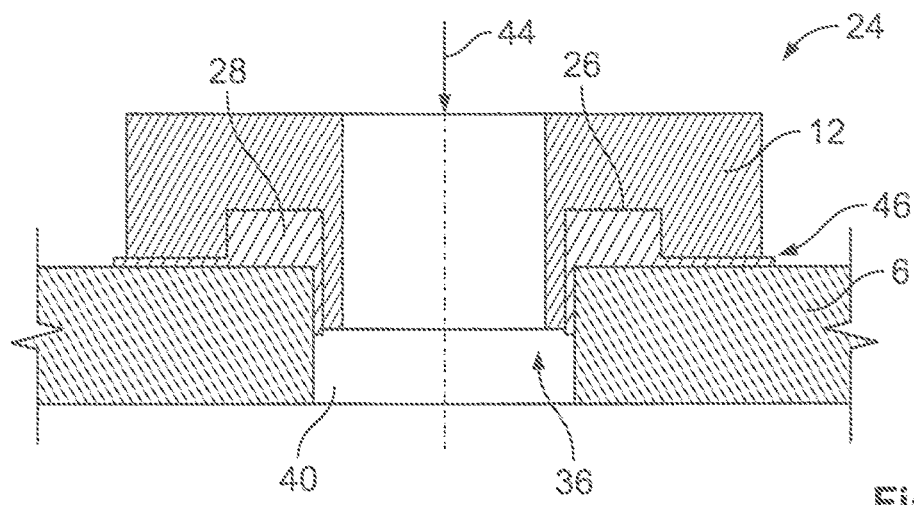
FIG. 3 is a sectional view of the contact and the mating contact of FIG. 2 in a soldered state.

The contact 12 has a contact surface 22 which is situated opposite the mating contact 6 in a completed electrical connection 24 shown in FIG. 3. The contact 12 has at least one recess 26 into which at least one soldering body 28 made from hard solder is pressed. In an embodiment, the recess 26 is groove-shaped. If the contact 12 is annular, for example, the recess 26 is an annular groove which is concentric relative to the contact 12 or to an annular contact surface 22.

In an embodiment, the soldering body 28 is a molded part, for example, a sintered part, cast part, or a part which is made from hard solder and generated by plastic deformation. The soldering body 28 is fully pressed into the recess 26 such that it fills it as far as possible without air pockets. The soldering body 28 has a cross-sectional shape complementary to the cross-section of the recess 26 before being pressed into the contact 12. The transition resistance between the soldering body 28 and the contact 12 can be kept low by a full-surface contact between the soldering body 28 and the recess 26 or the contact 12.

Figure 2:
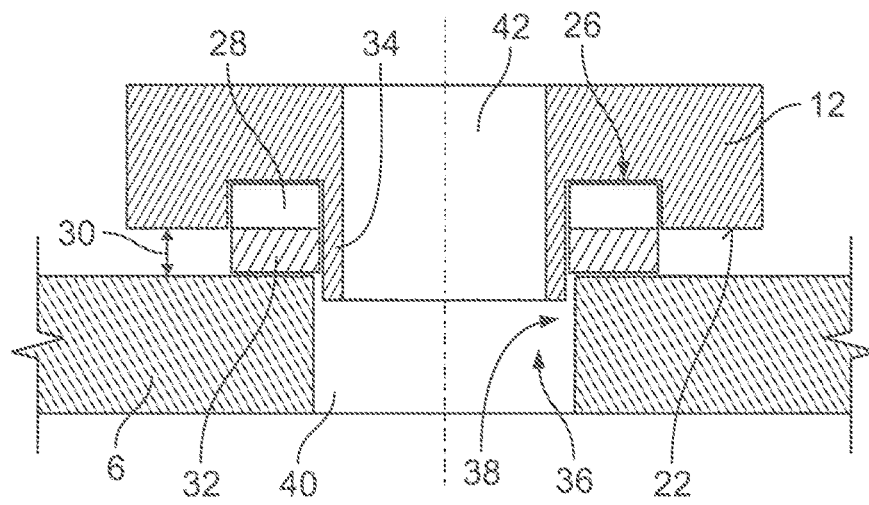
FIG. 2 is a sectional view of a contact and a mating contact according to an embodiment in a non-soldered state.

The pressed-in soldering body 28, as shown in FIG. 2, projects beyond the contact surface 22 by an overhang 30. The quantity of the hard solder contained in an overhanging region 32 determines the quantity of hard solder which is located between the contact 12 and the mating contact 6 when the connection 24 shown in FIG. 3 is fully hard-soldered. A constant quantity of hard solder can thus always be supplied through the use of soldering bodies 28 and recesses 26 having dimensions which have narrow tolerances.

As shown in FIG. 2, the contact 12 has a protrusion 34 which serves to align the contact 12 and mating contact 6. The protrusion 34 protrudes from the contact surface 22 parallel to the overhang 30 or in the direction thereof. In an embodiment, the protrusion 34 is collar-shaped. The protrusion 34 is annular and concentric relative to the contact surface 22, in particular if the recess 26 and/or the contact surface 22 are annular. In an embodiment, the protrusion 35 is surrounded by the soldering body 28.

The soldering body 28 abuts against the protrusion 34 such that the protrusion 34 forms a guide along which the soldering body 28 is inserted and pressed into the recess 26. The protrusion 34 is part of a centering device 36 which cooperates or engages with a receptacle 38 which is configured complementary to the protrusion 34, as shown in FIG. 2. In the shown embodiment, the receptacle 38 is a central opening 40 of the mating contact 6 which aligns with a central passage 42 of the contact 12. The opening 40 and the passage 42 receive the screw 16.

In order to align the contact 12 and the mating contact 6, before the soldering body 28 abuts the mating contact 6, the protrusion 34 projects beyond the soldering body 28. In this manner, an alignment takes place before the soldering body 28 abuts the mating contact 6. In another embodiment, the protrusion 34 is arranged on the mating contact 6. In other embodiments, other centering devices which are configured differently, for example a mutually engaging toothing and/or mutually engaging pins and receptacles, are also possible.

Before or after positioning the mating contact 6 and the contact 12 as shown in FIG. 2, in which the soldering body 28 rests on the mating contact 6, the soldering body 28 is inductively heated. The mating contact 6 and/or the contact 12 can be heated therewith. As soon as the soldering body 28 begins to melt, which, due to the eddy currents, occurs first in the overhanging region 32, the contact 12 and mating contact 6, under the action of a contact pressure 44, begin to move towards each other while the soldering gap 46 reduces as shown in FIG. 3. The melted hard solder is pushed into a soldering gap 46, where it spreads. A lateral washing-away of the mating contact 6 or the contact 12 on the hard solder melt in a direction parallel to the contact surface 22 is avoided by the centering device 36. At the same time, in the shown embodiment, the collar-shaped protrusion 34 serves as a barrier which inhibits the hard solder from entering the central opening 40 of the mating contact 6 by virtue of a locally increased flow resistance.

In an embodiment, a flux can be part of the soldering body 28 or applied onto the soldering body 28, mating contact 6, and/or contact 12 before the soldering body 28 is melted. In another embodiment, at least the melting of the soldering body 28 takes place in a shielding gas atmosphere so that a flux can be omitted.

In the fully hard-soldered electrical connection 24 shown in FIG. 3, the recess 26 continues to be filled by the soldering body 28, and is filled completely such that the entire surface of the recess 26 is contacted by the soldering body 28 and the lowest possible transition resistance is obtained. In order to prevent the hard solder from flowing out of the recess 28, the heating is controlled depending on the distance between the mating contact 6 and the contact 12. The hard solder is only completely liquefied if the soldering gap 46 is sufficiently small to prevent the hard solder from flowing out. The hard solder is also located in the centering device 36. In the completed electrical connection 24, the contact 12 is materially bonded to the mating contact 6.

Since the size of the soldering gap 46 in the complete connection 24 always stays the same by virtue of the constant size of the melted overhanging region 32, high manufacturing quality can be achieved. The height of the electrical connection 24 varies only slightly. At the beginning of the soldering process, the hard solder is already located in the soldering gap 46, and does not need to be first drawn from the outside through the capillary action into the soldering gap 46, which further guarantees a uniform distribution of the hard solder in the soldering gap 46.

What is claimed is:

1. An electrical contact for forming a materially bonded, electrically conductive connection to a mating contact, comprising:
    a contact body including:
        a top surface and a contact surface arranged opposite the top surface, the contact surface configured to be joined with the mating contact;
        a passage extending through the contact body from the top surface;
        a recess extending into the contact surface in the direction of the top surface and adjacent the passage; and
    a soldering body formed of a hard solder material pressed into the recess and protruding out from the recess beyond the contact surface prior to a soldering operation,
    wherein the contact surface, the recess, and the soldering body have an annular shape.

2. The electrical contact of claim 1, wherein the soldering body is a molded part.

3. An electrical connection, comprising:
    a contact having a contact surface with a recess extending into the contact surface and a soldering body formed of a hard solder material disposed in the recess;
    a mating contact hard-soldered to the contact surface of the contact by the hard solder material of the soldering body; and
    a screw pushing the contact and the mating contact together.

4. The electrical contact of claim 1, wherein the contact body has a protrusion projecting from the contact surface in a direction opposite the top surface and parallel to the soldering body, the protrusion including a first side defining the passage and a second side at least partially defining the recess.

5. The electrical contact of claim 4, wherein the protrusion projects beyond the soldering body.

6. An electrical connection, comprising:
    a contact having:
        a top surface and a contact surface arranged opposite the top surface;
        a passage extending through the contact from the top surface;
        a recess extending into the contact surface in the direction of the top surface and adjacent the passage;
        a protrusion extending from the contact surface in a direction opposite the top surface; and
        a soldering body formed of a hard solder material disposed in the recess; and
    a mating contact hard-soldered to the contact surface of the contact by the hard solder material of the soldering body, the mating contact including a receptacle into with the protrusion of the contact engages to position the contact with respect to the mating contact.

7. The electrical connection of claim 6, wherein the hard solder material is disposed between the protrusion and the receptacle.

8. The electrical connection of claim 3, wherein the contact surface, the recess, and the soldering body have an annular shape.

9. A cell connector, comprising:
an electrical connection including:
a contact having:
a planar contact surface with a recess extending into the contact surface;
a soldering body formed of a hard solder material disposed in the recess;
a passage defined through the contact; and
a protrusion projecting from the contact surface; and
a mating contact abutting the planar contact surface and engaging with the protrusion, the mating contact hard-soldered to the contact surface of the contact by the hard solder material of the soldering body.

10. The cell connector of claim 9, wherein the recess extends into the contact surface in a direction parallel to the direction of the passage through the contact.

11. The cell connector of claim 10, wherein the protrusion includes a first side defining the passage and a second side at least partially defining the recess.

12. The cell connector of claim 11, wherein the mating contact comprises a receptacle receiving the protrusion.

13. The electrical connection of claim 6, wherein the protrusion includes a first side defining the passage and a second side defining the recess.

14. The electrical connection of claim 13, wherein the first side comprises an interior wall of the protrusion, and the second side comprises an exterior wall of the protrusion opposite the interior wall.

15. The electrical connection of claim 14, wherein the recess surrounds the passage.

16. The electrical connection of claim 15, wherein the passage comprises a through hole, and wherein the recess comprises an annular recess.

17. The electrical connection of claim 16, wherein the protrusion comprises a cylindrical protrusion and the receptacle comprises a hole sized to receive the protrusion.

18. The electrical contact of claim 4, wherein the first side comprises an interior wall of the protrusion, and the second side comprises an exterior wall of the protrusion opposite the interior wall.

19. The electrical contact of claim 4, wherein the recess surrounds the passage.

* * * * *